United States Patent [19]
Petrovich et al.

[11] Patent Number: 5,513,730
[45] Date of Patent: May 7, 1996

[54] NONLINEAR SHOCK ABSORBER

[76] Inventors: Paul A. Petrovich, 11269 Judd Rd., Fowlerville, Mich. 48836; David L. Kuhn, 43068 Bond Ct., Sterling Heights, Mich. 48313

[21] Appl. No.: 394,107

[22] Filed: Feb. 3, 1995

[51] Int. Cl.⁶ ............................ F41F 19/06; F16F 11/00
[52] U.S. Cl. .............. 188/271; 42/1.06; 89/43.01; 89/198; 188/129; 188/378; 188/381; 267/136; 267/204
[58] Field of Search ...................... 267/136, 204, 267/202, 203, 201, 196, 134–135, 201–213, 221; 188/378–381, 129, 271, 316; 42/1.06; 124/92, 25, 88, 25.6, 89; 273/73 R, 73 C, 73 G; 213/32 R, 28, 32 A

[56] References Cited

U.S. PATENT DOCUMENTS

| | | | |
|---|---|---|---|
| 2,733,914 | 2/1956 | Allendorff et al. | 267/135 |
| 4,279,091 | 7/1981 | Edwards | 42/1.06 |
| 4,397,217 | 8/1983 | Hupp | 89/177 |
| 5,343,649 | 9/1994 | Petrovich | 89/43.01 |

FOREIGN PATENT DOCUMENTS 408541  9/1966  Switzerland ........................ 267/204

*Primary Examiner*—Douglas C. Butler
*Attorney, Agent, or Firm*—Peter A. Taucher; Gail S. Soderling

[57] ABSTRACT

A nonlinear shock absorber is disclosed. The device has a housing filled with hydraulic fluid and contains a relatively heavy mass or piston supported by a helical coil. The helical coils disposed and shaped so as to provide a nonlinear resistance to a shock applied to the housing. During shock absorption fluid flows contra to the piston movement with a corresponding elongation of the helical coil spring causing the coil spring to engage an inner wall of the housing to provide for frictional dampening.

3 Claims, 2 Drawing Sheets

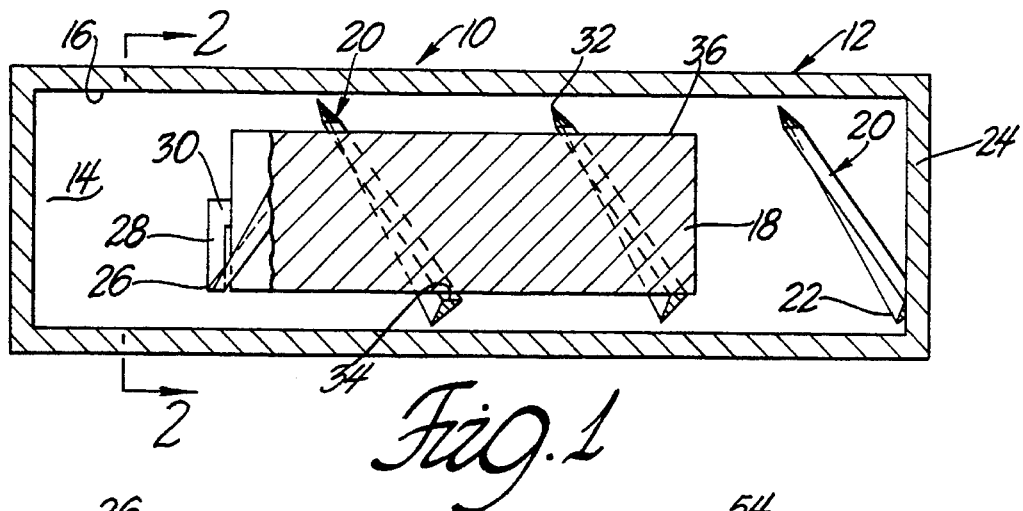
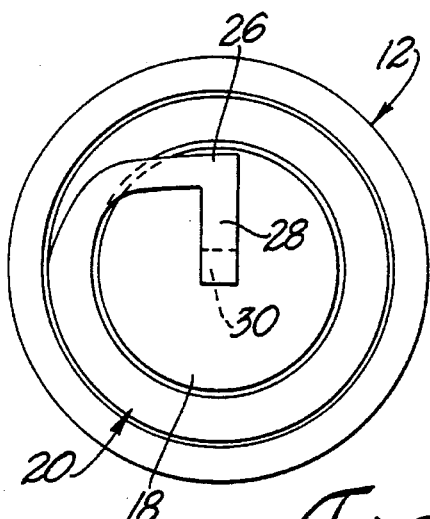
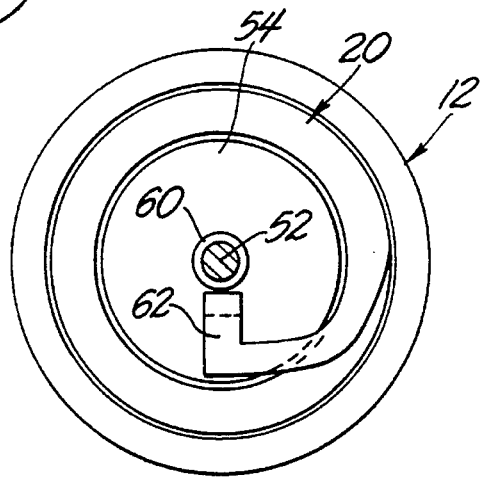
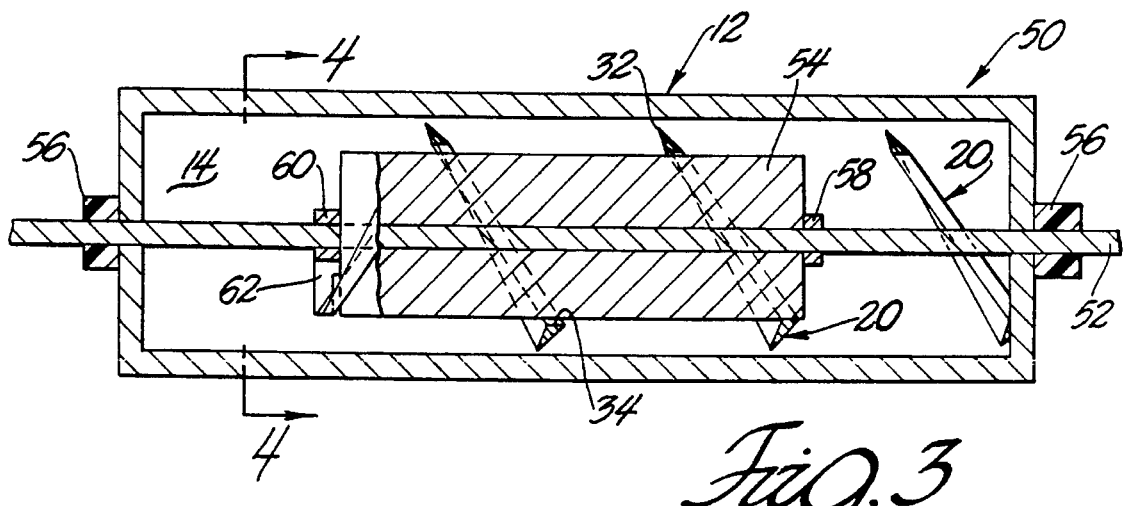

NONLINEAR SHOCK ABSORBER

GOVERNMENT INTEREST

The invention described herein may be manufactured, used and licensed by or for the Government for governmental purposes without payment to us of any royalty.

BACKGROUND OF THE INVENTION

1. Field of the Invention

In one aspect this invention relates to pneumatic shock absorbers. In yet a further aspect this invention relates to shock absorbers useful in sporting goods such as fire arms.

2. Prior Art

Shock absorption systems are an integral part of many firearms particularly semiautomatic fire arms. In general, the shock absorbers take the form of a device which redirects a portion of the gas formed upon firing a cartridge into a cylinder to dissipate a portion of the recoil.

Such devices provide some recoil relief and have gained wide acceptance. However, there is a sizeable range of possible charges used in shotguns and rifles with a corresponding difference in the possible recoil. Also, the amount of recoil which can be absorbed is limited since the amount of gas which can be diverted from the charge at the breech must be limited to avoid degrading performance. In conventional gas actuated systems, with larger charges there is an increase in the amount of recoil absorbed but it is not linear resulting in more punishing recoil at higher charge level.

There are also mechanical recoil absorption systems which use a friction system that can be mechanically adjusted for various charge levels. However these systems require disassembly and reassembly in order to be adjusted for various charge levels. Further mechanical devices tend to have a very limited number settings giving the devices limited utility.

It would be desirable to have a shock absorber or dampener which has a nonlinear response coefficient which would provide a mild absorption at low recoil levels and successively higher recoil absorption at higher levels without the need for adjustment. This could be manufactured so the effective absorption of an input force changes as a function of input force to provide a relatively constant output force.

BRIEF SUMMARY OF THE INVENTION

The present invention discloses a nonlinear shock dampener which can be mounted to a device to dampen the vibration or shock applied to the device when the device is subjected to shock loads of varying intensity. The shock dampener has a sealed cylindrical housing which is mounted in or attached to the device to be dampened. The cylindrical housing encloses a chamber with an inner wall the chamber being filled with a hydraulic fluid.

The chamber contains a piston coaxially mounted within the chamber. The piston will be formed so it is relatively dense when compared to the remaining materials of the shock dampener. The density variation provides the piston with an inertial component when there is relative movement between the cylinder and piston.

A helical coil member formed with a triangular cross section is coaxially mounted within the chamber. A first end of the helical coil is attached to one of the end walls of the housing and a second end of the helical coil is attached to the end of the piston furthest from the end of the housing to which the first end of the coil is attached. The helical coil is disposed within the chamber so it surrounds and encloses the piston. The attachment structure disclosed and used provides a cantilevered mounting which positions and coaxially aligns the piston within the fluid filled chamber. The helical coil's outer surface is the apex of the triangular cross section and is juxtaposed with the inner surface of the housing and the coil's inner surface is the base of the triangular cross section which is juxtaposed the piston's outer surface. The outer surface of the coil and housing's inner wall define a first radial gap while the piston's surface and the helical coil's inner surface define a second radial gap. At least one of the piston, coil and housing inner wall is shaped so that one of the gaps defined is tapered. The gap is tapered so the gap is smaller or thinner near the end where the helical coil is attached to the piston and the larger portion is at the end of the coil near its attachment to the housing.

When a shock acts on the invention there will be relative motion between the housing and piston causing a fluid flow and also elongation of the coil. As the helical coil extends, the triangular cross section of the helical coil will rotate and a portion of the apex of the triangular cross section will begin to engage portion of the adjoining wall or piston surface. This impedes flow of the fluid and also provides a frictional dampening component. The degree of engagement is proportional to the shock force applied and will result in a higher damping force in response to higher shock loads.

BRIEF DESCRIPTION OF THE DRAWING

In the accompanying drawing:

FIG. 1 is a side view in partial section of one embodiment of the invention;

FIG. 2 is an end view of FIG. 1 taken along the line 2—2 in FIG. 1;

FIG. 3 is a side view of a second embodiment of the invention;

FIG. 4 is an end view in partial section taken along the line 4-4 of FIG. 3;

DETAILED DESCRIPTION OF PREFERRED EMBODIMENTS

Figure 5:
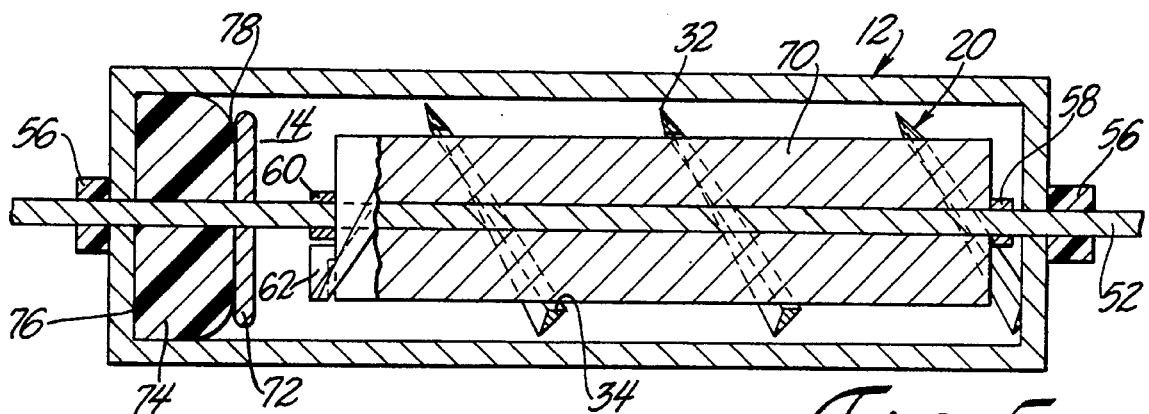
FIG. 5 is a side view in partial section of an embodiment containing an auxiliary energy absorption means.

Referring to the drawing where like numbers refer to like parts, and initially to FIG. 1 and 2, a nonlinear shock dampener according to this invention is designated generally 10. The shock dampener 10 will be mounted to a device not shown, which is subject to shock and which will have improved performance when the shocks are dampened. Firearms and sport rackets are possible examples. The shock dampener 10 has a sealed cylindrical housing 12 which is mounted in or attached to the device to be effected. The housing 12 forms a chamber 14 with an inner wall 16, the chamber being filled with a hydraulic liquid.

A piston 18 is coaxially mounted within chamber 14. The piston 18 is formed from materials which make it relatively dense when compared to the remaining materials of the shock dampener 10. The density variation provides an inertial difference between the piston to cause a relative movement between the housing 12 and piston 18 when a shock force is applied to the housing. The piston 18 can be formed of various materials, suitable materials being steel, lead or heavy ceramics. The piston 18 could also be formed with a heavy core such as lead and coated with a ceramic facing to provide a wear resistant surface. As depicted in FIG. 1, the piston 18 is a solid homogeneous mass disposed o coaxially within the chamber 14.

A helical coil member 20 formed with a triangular cross sectional area is coaxially mounted within the chamber 14. A first end 22 of the helical coil 20 is attached to an end wall 24 of the housing 12. A second end 26 of the helical coil 20 is attached to the end of piston 20 distal the end 24 of the housing 12. The second end 26 of the coil 20 has a leg 28 extending radially from the helical coil 20 towards the center line of the piston 18 and has an orthogonnaly extending arm 30 which extends from leg 28 and is attached to the piston 18 at its center line. This mounting structure gives the piston 18 a double cantilevered action, the attachment of the leg 30 to the piston 18 providing a cantilevered mounting of the piston with respect to the legs 28 and 30. In addition, leg 28 exerts a force on the arm 26 which generates the second cantilever force on the entire helical coil as it surrounds and encloses piston 18.

Figure 6:
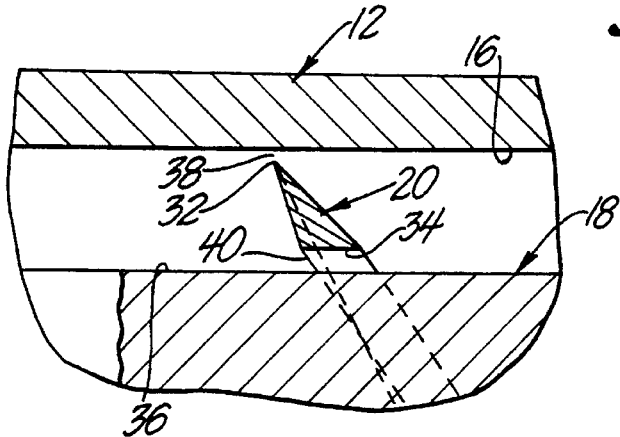
FIG. 6 is a cross sectional view of a helical member according to this invention.

A further understanding of the helical coil 20 structure and its function is shown by the enlarged cross section depicted in FIG. 6. The coil 20 is preferably formed with a scalene triangular cross section with the coil's outer surface being the apex 32 of the triangular cross section and is juxtaposed the inner surface 16 of the housing; while the coil's inner surface is the base 34 of the triangular cross section and is juxtaposed the piston's outer surface 36. The helical coil 20 and housing inner wall 16 define a first radial gap 38 while the piston's surface 36 and the helical coil base 34 define a second radial gap 40. At least one of the piston 18, coil and housing inner wall 16 is shaped so that at least one gap of the two radial gaps 38, 40 is tapered. As shown in the drawing the piston 18 is formed with the end nearest housing end wall 24 larger than the end to which helical coil 20 is attached. Also as shown, the helical coil 20 is formed with a taper, the portion of the coil nearest the point of attachment to piston 18 having a slightly smaller effective diameter. The resulting structural configuration provides an increasing size radial gap between the various surfaces.

When the housing 12 of FIG. 1 is subjected to a shock force on its left end as viewed in the drawing the piston 18 will tend to remain in place due to inertia and the housing will move relative to the piston causing the hydraulic liquid in chamber 14 to flow past the piston and also causing an elongation of the helical coil 20. As the helical coil 20 extends, the triangular shape causes the helical coil 18 to rotate the apex 32 of the triangular cross section closer to the housing wall thereby restricting fluid flow. As the helical coil 20 extends still further, it will bring a portion of the coil into engagement with a portion of the adjoining wall or piston surface. This further impedes flow of the fluid and also provides a frictional shock absorption component. The degree of extension and consequently the engagement is proportional to the shock force applied and will result in a higher damping force in response to higher shock loads.

A second variation of the present invention is shown in FIG. 3 and 4. In this variant, a shock dampener designated generally 50 is longitudinally slidable mounted on a shaft 52. The shaft 52 is in turn mounted to the device to be dampened, not shown, so that the shock to be dampened will be applied along the axis of the shaft 52. Seals 56 are located at each end of the housing 12 to prevent the hydraulic fluid contained in chamber 14 formed within the housing from escaping. The seals 56 allow the shaft 52 to move longitudinally relative to the housing 12. A relatively massive cylinder 54 having a longitudinal bore is coaxially mounted on the shaft 52, the cylinder 54 being mounted between collars 58, 60 fixed to the shaft 52 which prevent the cylinder 54 from moving longitudinally on the shaft 52 while allowing the cylinder to rotate as it translates within the housing during translation within the housing caused by the shock to be dampened.

The shaft 52 when subjected to a shock force on its right end as viewed in the FIG. 3, will move leftward as shown in the drawing. This will cause the cylinder 54 to move to the left while the housing 12 remains stationary relative to the cylinder. The helical coil 20 is attached to one end of the cylinder 54 by means of an arm 62 extending from the helical coil in the same manner as shown in FIG. 1. The cylinder 54 movement will cause the helical coil 20 to extend as described above causing the hydraulic fluid to flow. In addition, because the cylinder's lateral motion with the shaft 52, the helical coil 20 contraction brought about by extension of the helical coil will cause a corresponding rotation of the piston about the shaft. The rotation will be resisted by the cylinder's 54 moment of inertia to further assist in dampening the shock.

Figure 8:
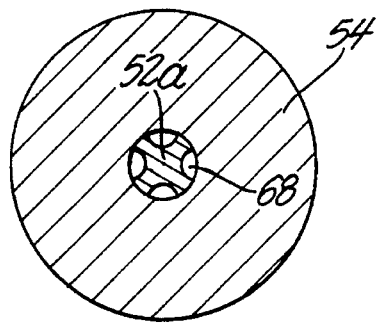
FIG. 8 is a view in section of a rod useful in the practice of this invention.

Referring to FIG. 8, a modified shaft configuration 52a for use in the structure of FIG. 2 is shown. This shaft structure can be used to further enhance the dampening qualities of the hydraulic fluid flow about the cylinder 54. FIG. 8 is a section through the cylinder 54 and shaft 52a only. The shaft 52a has a plurality of passages which extend along the shaft defining a plurality of fluid paths allowing the hydraulic fluid to flow counter to the movement of the piston. As the fluid exits the passages 68 at the end of the piston 54 the turbulence caused will dissipate some of the shock. The passages 68 could be formed as axial striations along shaft 52a or in a helical pattern to provide further fluid flow resistance. Yet a further passage configuration would the provide a textured surface on the passage walls creating a turbulence within the passage which would interact with the adjacent wall of the piston.

A third embodiment of the present invention is shown in FIG. 5 which represents a dual action variation on the structure of FIG. 2. In this structure, a piston 70 is formed with a greater length to increase its mass providing greater inertial dampening capacity. When a shock is applied to the shaft the piston will translate to the left causing a fluid flow as described above with respect to FIG. 2. When the helical coil 20 has extended to a certain point, the end of the piston 70 will contact a flat metal disc 72 mounted on the shaft 52 forcing the disc into a shaped elastomeric member 74 causing the elastomeric member to compress and dampen any remaining shock force. In this structure the shock is first absorbed by the inertia of the piston 70, then the helical coil 20, and finally the elastomeric member 74.

The elastomeric member 74 is shown with a flat base portion 76 in contact with the end wall of housing 12 the elastomeric member extending into the housing's chamber 14 and terminating in a face surface 78. The face 78 has a reduced area when compared to the base and is shown with a radiused portion between the face 78 and the remainder of the elastomeric member 74. The radiused portion provides a variable, increasing dampening capacity. The elastomeric member could be formed of various elastomeric materials natural or synthetic. The material chosen and its resiliency are within the skill of the art and a detailed descriptions omitted in the interest of brevity. The materials used would be chosen to resist the fluid in the chamber and have the absorptive capacity necessary to withstand the expected loads without failure of fracture.

Figure 7:
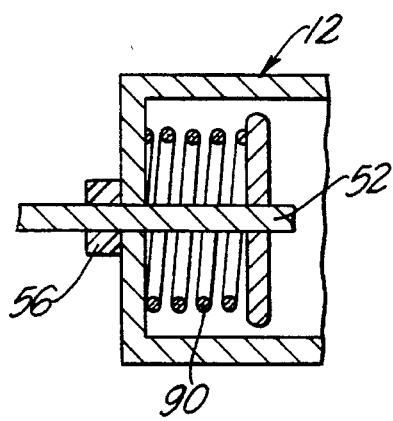
FIG. 7 shows an alternate shock absorption means useful in the embodiment shown in FIG. 3.

FIG. 7 shows and alternative structure for useful in place of the elastomeric body of FIG. 5. In FIG. 7 the elastomeric body has been replace by a coil spring 90 with a differential spacing between the adjacent turns of the helix. The differential spacing provides a spring with a variable spring constant with will have an increasing resistance to compression providing a differential absorption of shock forces place on the spring.

Various modifications and alterations will become apparent to those skilled in the art with out departing from the scope and spirit of this invention and it is understood that this invention is not limited to the illustrative embodiments set forth above.

What is claimed is:

1. A nonlinear shock dampener mounted to a device to dampen the vibration of the device when the device is exposed to a shock load comprising:

a shaft having at least one end attached to the device to be dampened;

a sealed cylindrical housing coaxially disposed about a portion of the shaft, the housing having sealed ports at opposite ends of the housing the ports allowing the shaft to move longitudinally through the housing and having a chamber formed therein by an inner wall, the chamber being filled with a hydraulic fluid;

a piston coaxially mounted about the shaft within the chamber, the piston having an axial bore which allows the piston to slide axially along the shaft, the piston is relatively dense when compared to the remaining materials of the shock dampener;

a helical coil member formed with a triangular cross sectional area, the helical coil being coaxially mounted within the chamber, a first end of the helical coil being attached to an end wall of the housing and a second end of the helical coil being attached to an end of the piston distal the end of the housing to which the first end of the coil is attached, the helical coil's outer surface being the apex of the triangular cross section and being juxtaposed the inner surface of the housing and the coil's inner surface being the base of the triangular cross section and being juxtaposed the piston's outer surface, the coil and housing inner wall defining a first radial gap, the piston and the helical coil defining a second radial gap, the piston, coil and housing inner wall being shaped so that at least one of the gaps defined is tapered; and a metallic disk member mounted on the shaft and spaced from one end of the housing, the dampener having a resilient member disposed between the housing and the metallic disk;

whereby, when the housing is subjected to a shock force the housing will move relative to the housing causing a fluid flow contra to the piston movement and a corresponding elongation of the helical coil causing a portion of the helical coil to engage a portion of the adjoining wall in response to a shock load results in the helical coil engaging the piston to impede the flow of fluid as the piston translates within the housing and when the piston contacts the disk and displaces it towards the housing the resilient member will absorb additional shock.

2. The shock dampener of claim 1 where said resilient member is a variable rate spring.

3. The shock damper of claim 1 where said resilient member is a shaped body formed of elastomeric material.

* * * * *